United States Patent

Frischknecht et al.

[11] Patent Number: 5,878,044
[45] Date of Patent: Mar. 2, 1999

[54] DATA TRANSFER METHOD AND APPARATUS

[75] Inventors: Deborah Ann Frischknecht, Kanata; John Frank Pillar, Nepean; Alan Charles Coady, Ottawa; Jonathan David Loewen, Kanata, all of Canada

[73] Assignee: Northern Telecom Limited, Montreal, Canada

[21] Appl. No.: 637,961

[22] Filed: Apr. 25, 1996

[51] Int. Cl.[6] .................................................. H04J 3/16
[52] U.S. Cl. .................................... 370/466; 370/469
[58] Field of Search ................................ 369/298, 401, 369/402, 498, 502, 503, 535, 911, 537, 538, 465, 469, 466, 395, 464; 375/220, 257, 369, 370, 377

[56] References Cited

U.S. PATENT DOCUMENTS

| | | | |
|---|---|---|---|
| 4,071,887 | 1/1978 | Daly et al. | 375/377 |
| 4,736,394 | 4/1988 | Giovanelli et al. | 375/377 |
| 5,267,263 | 11/1993 | Feezel et al. | 375/220 |
| 5,619,499 | 4/1997 | Nakabayashi | 370/469 |

OTHER PUBLICATIONS

"Four Channel DSI Framer", Eugene L. Parrella et al., IEEE International ASIC Conference and Exhibit, Mar. 1994, pp. 445–448.

*Primary Examiner*—Chau Nguyen

[57] ABSTRACT

The invention resides in the field of transferring data and other information from multiple asynchronous TDM channels across a synchronous interface in digital blocks of a preset length. Presently, transfer of data and timing information requires serial transmission of frame payload, qualified with clock and frame pulse indications. A separate set of these signals is required in both directions for each port or physical link. An interface of the invention permits data transfer in blocks which are uniquely identified for a specific port or links and the position of the block within the frame (if the transfer is one of framed data). The invention greatly reduces the number of required signals, thus enabling reduction of pin count requirements and an increase in the number of serviced ports.

13 Claims, 4 Drawing Sheets

DATA TRANSFER METHOD AND APPARATUS

FIELD OF THE INVENTION

The present invention relates generally to interfacing non synchronized digital signal streams which exist in different sublayers of the physical layer. In particular, it is directed to interfacing of digital signal streams by way of a master and a slave exchanging blocks of data stream, each comprising a predetermined number of bits.

BACKGROUND OF THE INVENTION

The current method of transfer of data and timing information between Physical Medium Dependent (PMD) and Transmission Convergence (TC) sublayers requires serial transmission of frame payload qualified with clock and frame pulse indications. A separate set of these signals is required in both directions for each port or physical link.

For example, digital signals are often multiplexed to produce higher bit rates for higher capacity transmission systems, as a means of utilizing the same transmission medium economically for many different users. This multiplexing is one of functions that perform such data transfer. Different digital signal hierarchies were developed in North America, Europe and other parts of the world. In North America, DS1, DS2 and DS3 whose bandwidths are respectively 1.544 Mbit/sec., 6.312 Mbit/sec. and 44.736 Mbit/sec. are used. Transmission services which provide these digital signals are called T1, T2 and T3. DS0 is a basic TDM signal (voice channel signal) of 64 Kbit/sec. Thus, 24 DS0 streams are multiplexed to one DS1, four of which are combined into one DS2. Seven DS2 streams are multiplexed to one DS3 stream. At each multiplexing operation, certain overhead bit or bits are added for framing, synchronization and other housekeeping functions. In some multiplexing operations, certain payload databits are borrowed for housekeeping functions as well.

According to "Four channel DS1 Framer" Eugene L. Parrella et al, IEEE International ASIC Conference and Exhibit:

"Wideband telecommunications services such as T3, SONET, and inverse multiplexed T1 services are driving more highly integrated multichannel T1 cards. With the availability of single chip M13 (T1/T3) multiplexers and multichannel SONET mappers, T1 framers and T1 line interface units may become the bottlenecks to further reductions in card size, power and cost. A multichannel T1 framer offers substantial board area reduction, and is highly desirable if competitive in power consumption and cost to multiple single channel framers.

As an example, a DS0-T3 switching application can be considered. A single chip M13 multiplexer is employed, multiplexing 28 DS1s into a DS3. To convert DS0's into 28 framed DS1's, 28 DS1 framers are required. A multichannel framer can be used effectively to lower parts count for the system."

Therefore, the above application of DS1–DS3 interface requires 112 connections between a group of 7 quad DS1 framers and a M13 multiplexer.

The present invention permits the transfer of data and timing information between the PMD and TC sublayers, a predetermined sized block of data at a time. Each data block is uniquely identified with an identification number which specifies the port or physical link with which it is associated and the position of the data block within the frame (if the transfer is one of framed data). Timing information is passed between the two sublayers in digital representation form. It represents an offset with respect to a reference clock which can be board, system, or network wide.

This invention greatly reduces the number of signals required between the two sublayer devices. This makes it physically possible to increase the number of ports serviced by PMD and TC sublayer devices by greatly reducing their pin count requirements.

In one embodiment, the present invention permits interfacing between digital signals of two different hierarchical levels very efficiently. In particular, as an example, in a DS1–DS3 interface only 24 lines (instead of 112 connections mentioned above) are required, running at a reasonable speed of 50 MHz.

Furthermore, for channelized applications, the necessity to demultiplex onto separate asynchronous bit streams only to multiplex back to one synchronous stream has been eliminated.

OBJECTS OF THE INVENTION

It is therefore an object of the invention to provide a method and an apparatus for transferring data, timing and other control information between two sublayer devices efficiently.

It is another object of the invention to provide a method and apparatus for interfacing two sublayer devices which require less signals for transferring data and other information.

SUMMARY OF THE INVENTION

Briefly stated, according to one aspect, the invention is directed to a method of synchronously transferring data and other information between a physical medium sublayer and a transmission convergence sublayer, each handling a non synchronized digital signal stream. The method comprises steps of a master bidirectionally handling a non-synchronized digital signal stream to/from the physical medium sublayer and a slave bidirectionally handling a non-synchronized digital signal stream to/from the transmission convergence sublayer. The method further includes steps of the slave and the master exchanging the data and other information in individually identifiable blocks of predetermined lengths during each successive exchange sequence of a preset length of time in a time synchronized fashion under a clock signal. The method comprises yet further steps of, during each exchange sequence, the master sending the slave identifiers of blocks of data and other information to be exchanged between the slave and the master, and in response to the identifiers, the slave exchanging with the master the blocks of data and other information so identified.

According to another aspect, the invention is directed to an interface for synchronously transferring data and other information between a physical medium sublayer and a transmission convergence sublayer, each sublayer handling a non-synchronized digital signal stream. The interface comprises a master for bidirectionally handling a non-synchronized digital signal stream to/from the physical medium sublayer and a slave for bidirectionally handling a non-synchronized digital signal stream to/from a transmission convergence sublayer. The interface further includes time division multiplexed buses connecting the master and the slave for exchanging the data and other information in individually identifiable blocks of predetermined lengths during each successive exchange sequence of a preset length of time, in a time synchronized fashion under a clock signal, in that the identifiable blocks in each successive exchange sequence contain data and their identifiers.

DETAILED DESCRIPTION OF THE PREFERRED EMBODIMENTS OF THE INVENTION

Generally speaking, the invention concerns a synchronous interface used to transfer multiple bidirectional non-synchronized data streams between a PMD and the Physical Layer.

One embodiment of the invention is concerned with multiplexing digital signals of different hierarchy levels, in which 28 DS1 data streams are interfaced into one DS3 data stream. According to DS1 and DS3, the payload data are formatted in blocks of an integer multiple of octets. Conveniently, therefore, this can be called an Octet Stream Interface. This interface defines the exchange of octets of data between the two or more devices based on an Octet Stream Identifier which uniquely identifies each stream of data and related control information. The Octet Stream Identifier specifies the port or physical link with which the data and control information are associated as well as the byte position of the octet within the frame (if the transfer is one of framed data).

Figure 1:
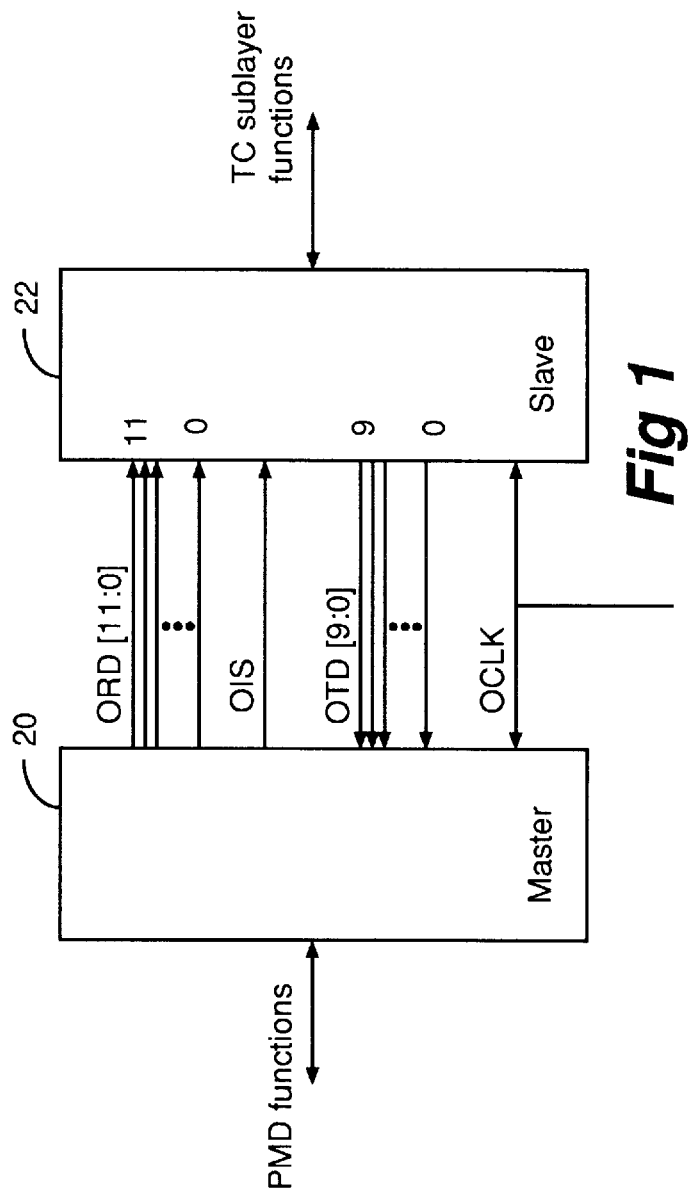
FIG. 1 is a schematic illustration of an interface according to one embodiment of the invention.

FIG. 1 illustrates schematically one embodiment of the invention in which a master and a slave are shown. The device which communicates with the PMD is described as the Octet Stream Master 20 since it provides the timing and sequencing for the transfers based on the availability of payload data from the facility and the requirement to provide payload data to the facility, e.g. TC sublayer. The device providing the TC sublayer is called the Octet Stream Slave 22 since it simply responds to requests made by the timing and sequence master. The direction of flow from the master to the slave is called the receive direction, and the direction opposite thereto is the transmit direction. The transmit and receive transfers both use the same transfer clock. If the maximum transfer clock is e.g., 50 MHz, the maximum transfer rate would be 100 Mbps in each direction. The transfer of data in blocks of a predetermined length, e.g. blocks of an octet, is via a common transfer clock and is synchronized at the block level.

Figure 2:
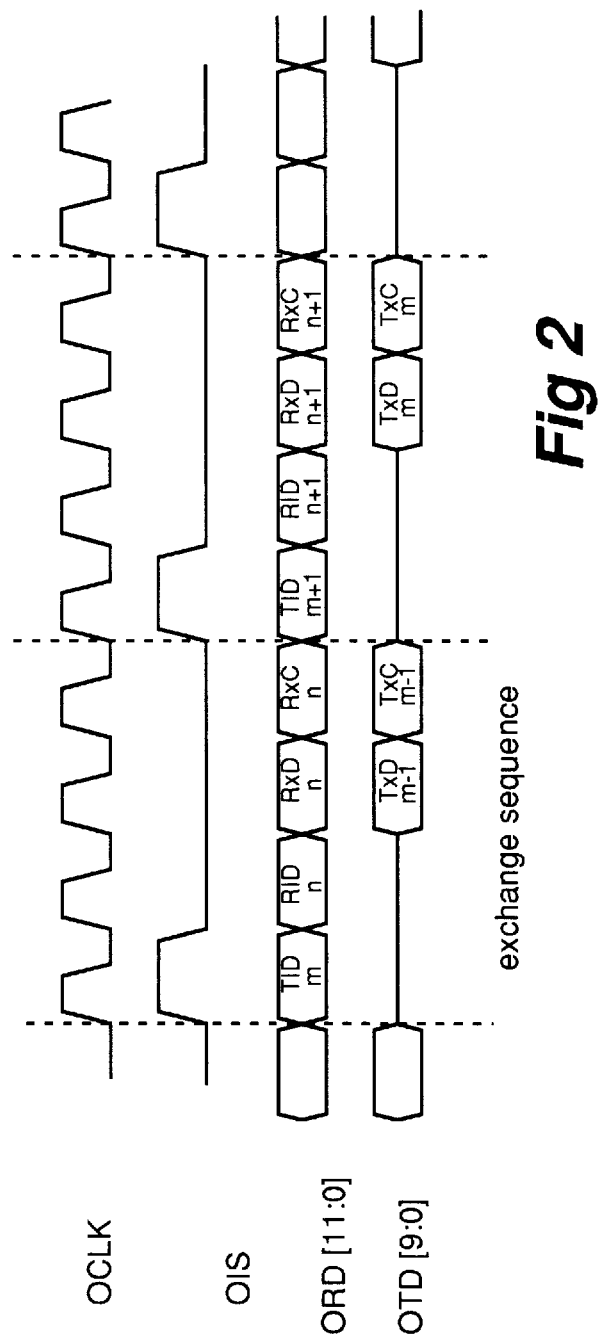
FIG. 2 is a timing diagram of signals of one embodiment of the invention.

Referring to FIG. 2, each exchange sequence consists of four transfer cycles and achieves transfer of a data block in two directions. In this embodiment, the data block is one octet long. However, it is, of course, possible to choose any reasonable length although, due to well adapted standards which presently exist, certain sizes would be more logical than others.

Referring further to the figure, the following signals are required:

ORD[11:0]

This is Octet stream Receive Data and contains up to 12 bits of data driven from the Octet Stream Master 20 to the Octet Stream Slave 22. ORD[11] is the MSB (most significant bit).

OTD[9:0]

This is Octet stream Transmit Data and contains up to 10 bits of data driven from the Octet Stream Slave 22 to the Octet Stream Master 20. OTD[9] is the MSB. OTD is tri-stated by all devices which are not programmed to respond to a particular TID value.

OCLK

This is Octet stream CLocK and is an octet transfer/synchronization clock for synchronizing transfers on both ORD and OTD.

OIS

This is Octet stream Interface Sync and is an active high signal asserted by the Octet Stream Master during the first transfer cycle of an exchange sequence.

Referring further to FIG. 2, operation and timing are described in detail in connection with clock cycles. The two unidirectional busses ORD and OTD are TDM busses which carry different information depending on the transfer cycle in the exchange sequence governed by OIS. An exchange sequence is the transfer of one complete set of parameters in both the transmit and receive directions.

During one exchange sequence, payload data blocks RxD and TxD identified by the master are exchanged in receive and transmit directions. The signalling information RxC and TxC so identified by the master are also exchanged in the same exchange sequence. The master identifies data and signalling information for exchange by sending the slave identification numbers in TID and RID.

According to the embodiment, an Octet Stream Identification number is a number from 0–1023 which is used to uniquely identify a specific octet stream. The Octet Stream Master applies a base Octet Stream Identifier for each link or virtual tributary supported. Consecutive Octet Stream Identifiers are then assigned for each channel in a link. If the link is unchannelized, the base octet identification number is used for all octets. The Octet Stream Slave device requires a programmable internal mapping of octet id's to channel numbers to provide a level of indirection.

Definition of the data content is as follows:

TID (Transmit IDentifier)

This is a 12 bit value sent by the Octet Stream Master device which identifies the required TxD and TxC in the next exchange sequence. TID[9:0] contains the Octet Stream Identifier number, TID[10] is asserted if data is required, and TID[11] is asserted if the octet requested is in the first frame of a multiframe, where a multiframe is service specific. An example of multiframe sizes is given in the "DS1/DS3 Example" on pages 8 and 9. Signalling bits will be provided by the Octet Stream Slave in the first frame in a multiframe if they are valid.

RID (Receive IDentifier)

This 12 bit value sent by the Octet Stream Master device identifies the RxD and RxC in the following two clock periods. RID[9:0] contains the Octet Stream Identifier number, RID[10] is asserted if valid data is present, and RID[11] is asserted if this octet is in the first frame of a multiframe. Valid signalling bits will be present with each octet in the first frame of a multiframe.

RxD (Receive Data)

This is an 8-bit payload value which is identified by RID on the previous clock cycle. This is valid if RID[10] is asserted.

TxD (Transmit Data)

This is an 8-bit payload value which is identified by the TID in the previous exchange sequence.

RxC (Receive Control)

This value contains control information passed from the Octet Stream Master to the Octet Stream Slave. This control information is identified by RID in two previous clock cycles. The contents of the control field are illustrated in the Table below when RxC is set for RCC=011.

| | 11 | 10:8 | 7 | 6 | 5 | 4 | 3 | 2 | 1 | 0 |
|---|---|---|---|---|---|---|---|---|---|---|
| RxControl | LS | RCC | A | B | C/A' | D/B' | RTS | | | |

TxC (Transmit Control)

This value contains control information passed from the Octet Stream Slave to the Octet Stream Master. This control information is identified by the TID in the previous block exchange sequence. The contents of the control field are illustrated in the Table below when TxC is set for TCC=11.

| | 9:8 | 7 | 6 | 5 | 4 | 3 | 2 | 1 | 0 |
|---|---|---|---|---|---|---|---|---|---|
| TxControl | TCC | A | B | C/A' | D/B' | RTS | | | |

RCC=Receive Control Code. This code indicates what data will be present in bits 7-0 as follows:

000: RXC[7:0]=User defined field
001: RXC[7:4]=Updated Signalling bits
   : RXC[3:0]=Unused
010: RXC[7:4]=Unused
   : RXC[3:0]=Updated SRTS value
011: RXC[7:4]=Updated Signalling bits
   : RXC[3:0]=Updated SRTS value
100–111: RXC[7:0]=User defined field
TCC=Transmit Control Code. This code indicates what data will be present in bits 7-0 as follows:
00: TXC[7:0]=User defined field
01: TXC[7:4]=Updated Signalling bits
   : TXC[3:0]=Unused
10: RXC[7:4]=Unused
   : RXC[3:0]=Updated SRTS value
11: RXC[7:4]=Updated Signalling bits
   : RXC[3:0]=Updated SRTS value
ABCD=ABCD Signalling bits
ABA'B'=AB Signalling bits for two superframes when using DS1 SF format. A'B' are the signalling bits for odd numbered superframes and AB is for even numbered superframes.
LS=Link Status for link corresponding to the RID. This is a user defined status field used to pass link information such as LOS, OFF, LOF, etc. as required.
RTS=Rx RTS value. This is CES specific timing information, as defined in the I363.1 specification. This is an RTS formatted value used to support SRTS or any other clock recovery mechanism. Bit 3=RTS most significant bit.

In the embodiment where a single DS3 master to a single slave is used, the following identification numbers should be used in non-transparent mode.

| | DS1 #1 | DS1 #2 | DS1 #3 | ... | DS1 #28 |
|---|---|---|---|---|---|
| DS0 #1 | 0 | 24 | 48 | ... | 648 |
| DS0 #2 | 1 | 25 | 49 | ... | 649 |
| DS0 #3 | 2 | 26 | 50 | ... | 650 |
| . | . | . | . | ... | . |
| . | . | . | . | ... | . |
| DS0 #24 | 23 | 47 | 71 | ... | 671 |

In the transparent mode, the following numbers apply:

| | DS1 #1 | DS1 #2 | DS1 #3 | ... | DS1 #28 |
|---|---|---|---|---|---|
| DS0 #1 | 0 | 24 | 48 | ... | 648 |
| DS0 #2 | 0 | 24 | 48 | ... | 648 |
| DS0 #3 | 0 | 24 | 48 | ... | 648 |
| . | . | . | . | ... | . |
| . | . | . | . | ... | . |
| DS0 #24 | 0 | 24 | 48 | ... | 648 |

It should be noted that the DS1–DS3 embodiments are given as example only. It would be apparent to those skilled in the art that the invention is equally applicable to other digital signal streams, such as E1, J2, STS-1, E3, STM-1, etc.

Figure 3:
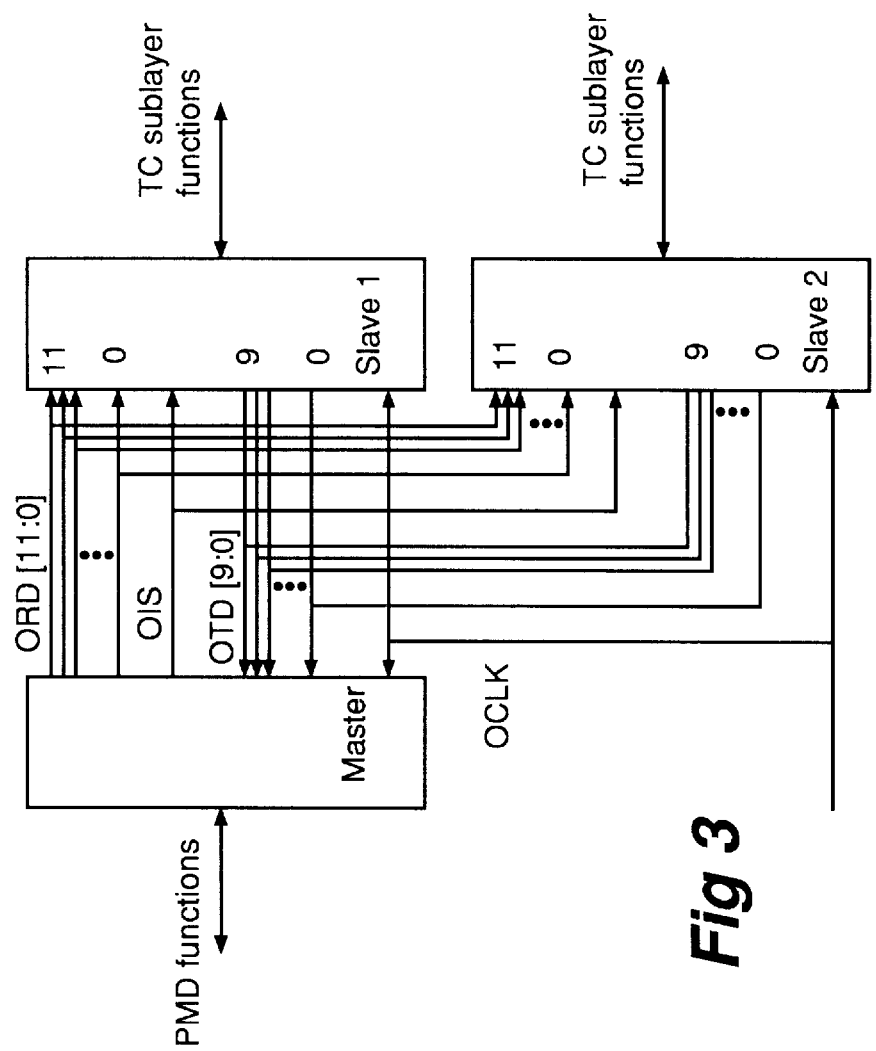
FIG. 3 is a schematic illustration of an interface according to another embodiment of the invention in which more than one slave is used.

Referring to FIG. 3, another embodiment is schematically illustrated in which multiple slaves are provided with one master. If multiple masters are required, they must be connected in a manner to appear as one Octet Stream Master as defined herein.

Figure 4:
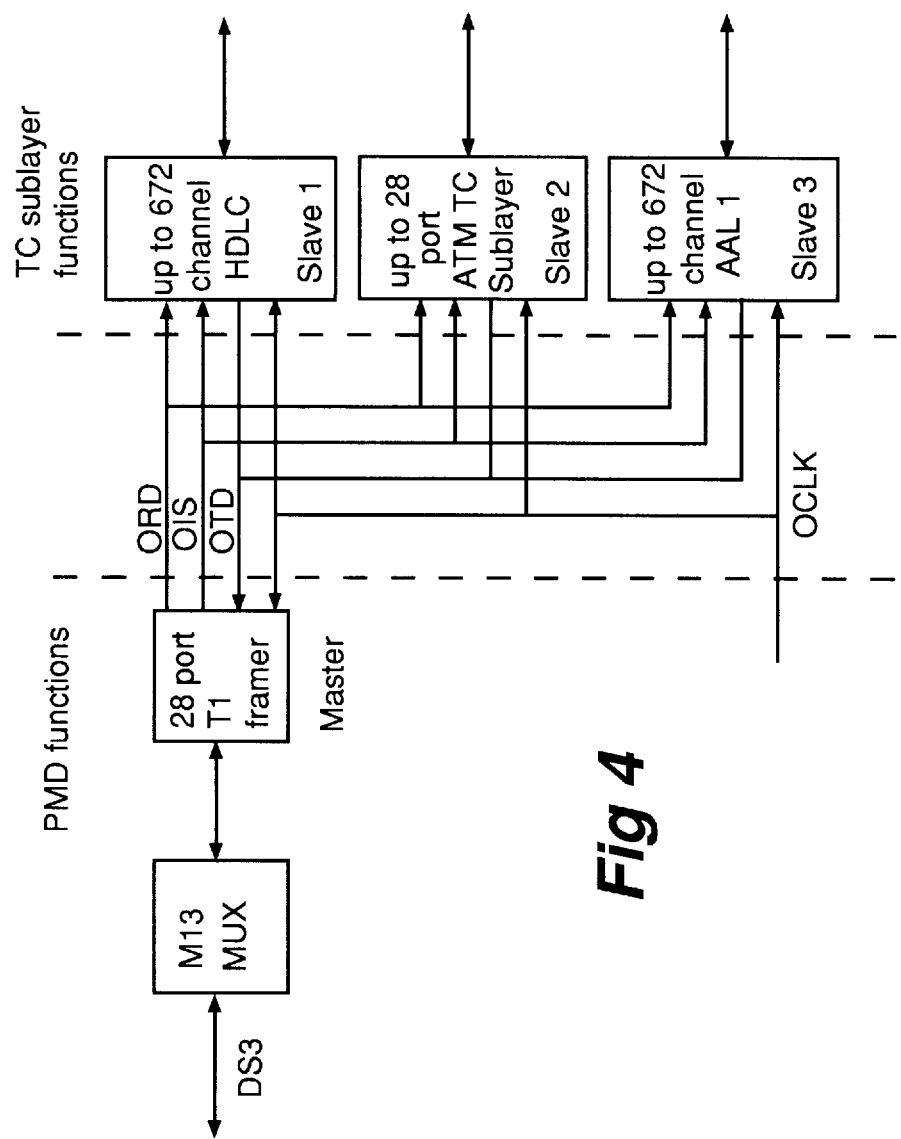
FIG. 4 is a schematic illustration of an interface according to yet another embodiment of the invention in which HDLC, ATM TC and AAL1 sublayers are shown as examples.

One other preferred embodiment is schematically illustrated in FIG. 4 in which, as in FIG. 3, multiple slaves are provided with one master. The master in this embodiment includes a M13 multiplexer for handling DS3 signals in the physical medium sublayer. The master includes 28 port T1 framers which are connected to three slaves by busses and other connections. ORD and OTD are time division multiplexed busses. On the transmission convergence sublayer, one slave carries up to 672 channel HDLC (high level data link control) signals, another up to 28 ATM TC sublayer signals. The third slave handles up to 672 channel AAL1 (ATM adaptation layer 1) signals. Of course, other TC sublayer signals are possible.

What is claimed is:

1. A method of synchronously transferring data and other information between a physical medium sublayer and a transmission convergence sublayer, each handling a non-synchronized digital signal stream, comprising steps of:

a master bidirectionally handling a non-synchronized digital signal stream to/from the physical medium sublayer;

a slave bidirectionally handling a non-synchronized digital signal stream to/from the transmission convergence sublayer;

the slave and the master exchanging the data and other information in individually identifiable blocks of predetermined lengths during each successive exchange sequence of a preset length of time in a time synchronized fashion under a clock signal;

the method further comprising steps of:
  during each exchange sequence,
    the master sending the slave identifiers of blocks of data and other information to be exchanged between the slave and the master; and
    in response to the identifiers, the slave exchanging with the master the blocks of data and other information so identified.

2. The method according to claim 1 wherein an exchange sequence comprises a plurality of transfer cycles, and during each transfer cycle, the master sends the slave, respectively, the identifier of the data block to be received from the slave during the next exchange sequence, a data block, other information and their identifier.

3. The method according to claim 2 wherein during the coincidental transfer cycles, the slave sends the master respectively the data block and other information so identified by the master in the previous exchange sequence.

4. The method according to claim 3 wherein the other information exchanged between the master and the slave comprises control signals which include a timing signal, signalling information and/or other user definable information.

5. The method according to claim 4 wherein the timing signal is RTS values.

6. The method according to claim 4 wherein the signalling information is exchanged by the use of standard signalling bits contained in the control signals.

7. The method according to claim 4 wherein there is more than one slave and the method comprises a further step of:

one of the slaves, in response to the identifiers, exchanging with the master the blocks of data and other information so identified.

8. The method according to claim 7 wherein the non synchronized digital signal streams are any of DS1, E1, J2, DS3, E3, STS-1, and STM-1.

9. An interface for synchronously transferring data and other information between a physical medium sublayer and a transmission convergence sublayer, each sublayer handling a non-synchronized digital signal stream, comprising:

a master for bidirectionally handling a non-synchronized digital signal stream to/from the physical medium sublayer;

a slave for bidirectionally handling a non-synchronized digital signal stream to/from the transmission convergence sublayer under the control of the master;

time division multiplexed buses connecting the master and the slave for exchanging the data and other information so identified by the master in individually identifiable blocks of predetermined lengths during each successive exchange sequence of a preset length of time in a time synchronized fashion under a same clock signal; and the identifiable blocks in each successive exchange sequence containing data and their identifiers.

10. The interface according to claim 9, wherein the identifiable blocks in one successive exchange sequence on one time division multiplexed bus contain data and control signals and their identifier in addition to an identifier of data to be transferred on the second time division multiplexed bus in the following exchange sequence.

11. The interface according to claim 10, wherein the identifiable blocks in one successive exchange sequence on another time division multiplexed bus contain data and control signals so identified by an identifier on the first time division multiplexed bus in the previous exchange sequence.

12. The interface according to claim 11, wherein each exchange sequence is divided into four transfer cycles and each identifiable block is transferred in each transfer cycle in one direction over one time division multiplexed bus.

13. The interface according to claim 12, wherein there is more than one slave.

* * * * *